3,740,255
HUMIDITY RESISTANT PAINT SYSTEMS
David Brian Fox, Chelsea, Victoria, Australia, assignor to Dulux Australia Ltd., Melbourne, Victoria, Australia
No Drawing. Filed July 26, 1971, Ser. No. 166,264
Claims priority, application Australia, Aug. 7, 1970, 2,108/70
Int. Cl. B32b 15/08
U.S. Cl. 117—74                4 Claims

ABSTRACT OF THE DISCLOSURE

Conventional paint systems consisting of an undercoat film adhering to a metallic surface and a superimposed film of protective and/or decorative top-coat are known to provide inadequate blister resistance under some conditions of service. Paint systems of improved humidity performance are now disclosed in which the undercoat is modified by the addition to it of discrete, porous, polymer particles to provide the dry undercoat film with a water absorption of 5–65% by weight. The paint system as a whole must be a non-convertible coating.

---

This invention relates to humidity resistant paint systems and in particular to blister resistant undercoats for use therein and to their preparation.

A common cause of failure of paint films exposed to water or humid air is the formation of blisters in the film which distort and mar the appearance of the surface. These blisters appear to be filled at least tempoarily during their growth with water. The blisters may occur between the substrate and the paint film or, when the film comprises more than one coat of paint, between the successive coats; when it is uusually known as inter-coat blistering. The paint system with which this invention is concerned is that in which one or more so-called topcoats are applied over a priming coat which itself is formed or adheres to a metallic substrate.

It has been suggested that blisters form as the result of water up-take through the surface of the top-coat, which is then distorted by local aggregates of trapped liquid which form in the undercoat, at the interface between the undercoat and the top-coat or both. Two contrasting approaches have been suggested to overcome this problem.

The top-coat may comprise a film-forming polymer selected on the basis of its known very low water permeability; for example a polymer of vinylidene chloride. This imposes an immediate limitation on the composition of the film and if moisture does penetrate it, for example through local defects in the film or its substrate, the problem is amplified by the impervious nature of the film-forming polymer.

The alternative approach is to pigment the top-coat to a sufficient degree to allow it to "breathe" and thus rapidly discharge imbibed moisture back into the air. This method also has inherent disadvantages; for example such highly pigmented, porous films are usually mechanically weak, of inherently relatively low gloss and the rapid penetration of moisture through the film to the undercoat and hence to the substrate may be undesirable.

We have now found that these problems can be overcome in many paint systems by the use of undercoats which are so-prepared that they have a water absorption of from 5 to 65% by weight of the dry film. This water absorption is imparted to the undercoat by incorporating in it discrete, porous, polymeric particulate solids, which become embedded in and an integral part of the dry undercoat film. Because the porous particles are polymeric, they can be added to the undercoat in relatively large concentrations without necessarily detracting significantly from its physical film properties, e.g. its abrasion resistance and flexibility. That is the use of these particles avoids certain of the above-mentioned disadvantages of high pigment volume concentration undercoat films and has the added advantage of providing a means of predetermining the water uptake capacity of the dry film.

Although some improvement in humidity performance has been observed in a wide variety of paint systems, we have found that the most commercially useful results are obtained when both the undercoat and top-coat are substantially non-convertible coatings. "Non-convertible coatings" is an art-recognised term described, for example, in "Paint Technology Manual," Part I, Oil and Colour Chemists' Association, London (1961). A non-convertible coating is a coating in which a resinous film-forming material is dissolved or dispersed in a volatile liquid (which composition may also be pigmented). When a film of such a coating is applied to a substrate, volatile liquid evaporates leaving a film of resin (optionally pigmented) which does not undergo any significant chemical change during the film-forming process. Film formation takes place by deposition of the resin from solution or by the coalescence of dipserse resinous particles. The distinction is not a rigid one and it is commonly accepted that some degree of chemical change may take place to assist the final film hardening process. The characteristic feature is, however, that the initial dry film state is reached by solvent evaporation in air, optionally accelerated by heat, in what is frequently referred to as a lacquer-type dry, any chemical change which may take place during this period being virtually incidental to the solvent evaporation drying process.

Accordingly, we now provide a paint system which resists blistering under conditions of high humidity the system consisting of a metallic substrate to which is adhered a dry multi-layer non-convertible coating film consisting of a layer of undercoat and a superimposed layer of paint top-coat characterised in that the undercoat has a water absorption of from 5 to 65% of its dry film weight provided essentially by the incorporation therein of discrete, porous polymer particles.

By water absorption we mean the weight of water absorbed by the dried undercoat film when immersed in water for 48 hours. This time is taken as being sufficient for the film to become fully saturated by water. The water absorption is determined in the following manner. A weighed metal panel is coated on one face with undercoat (approximately 20 microns dry film build) the undercoat cured to a dry film and the panel reweighed to determine the weight of undercoat present. The panel is then immersed in water at 20° C. for 48 hours, surface dried with a soft cloth and re-weighed within 60 seconds. The water uptake is calculated as the percentage increase in weight of the undercoat film.

The dry undercoat and top-coat layers are applied to the metal substrate in conventional manner, e.g. by brush roller, spray, flow-coater or curtain-coater techniques from the corresponding liquid paint compositions, allowing the undercoat film to at least partially dry before applying the top-coat.

Apart from the requirement that the undercoat shall comprise porous polymer particles at a concentration sufficient to impart a water absorption of 5–65% to the dry film, we place no unusual limitations on the choice of non-convertible undercoats for the purpose of our invention. For example it would be obvious to one skilled in the art to avoid the use of an undercoat which has inherently poor wet adhesion to a metal substrate. This invention does not purport to impart adhesion to films which per se are deficient in this respect. It is well known, however, that the wet adhesion of certain undercoats both to metallic substrates and to superimposed top-coats is improved by adding to them adhesion promoting compounds and the use of undercoats so-modified is comprehended in the performance of this invention.

In general terms, a suitable undercoat will be one in which a resinous non-convertible film-forming material is dispersed or dissolved in a suitable volatile organic liquid to provide a liquid film-forming medium. Conventonal pigments, for example titanium dioxide, iron oxides, aluminium silicates, talc, whiting and barytes are then dispersed in this medium according to the known practices of the art and then porous polymer granules are added to provide the desired degree of porosity in the dried undercoat film.

It will be recognised that there are many materials available which meet our requirements of a suitable film-forming medium, the following being some typical, non-limiting examples.

The medium may be a solution in a volatile organic liquid of a cellulose ester, for example nitrocellulose and cellulose acetate butyrate. Alternatively, it may be a solution of a chlorinated or cyclised rubber.

A particularly useful group of resinous components are addition polymers and copolymers of α,β-ethylenically unsaturated monomers, which permit of considerable scope in formulation because of the ease with which many of them can be incorporated into liquid coating compositions as solutions or non-aqueous dispersions. For example the film-forming medium may comprise a homopolymer or copolymer of the following classes of monomers: vinyl esters and ethers, alkyl acrylates and methacrylates, alkyl fumarates and maleates, halogenated vinyls, aryl vinyls and olefins.

For example suitable monomers are vinyl acetate, vinyl propionate, vinyl caproate, vinyl stearate, vinyl esters of saturated tertiary monocarboxylic acids, vinyl siloxanes and the saturated mono-hydric alcohol esters of unsaturated acids, e.g. acrylic acid, methacrylic acid, maleic acid and fumaric acid, including those esters derived from methanol, ethanol, n-propanol, iso-propanol, n-butanol, iso-butanol, cyclohexanol, 2-ethyl hexanol, dodecanol, hexadecanol and octanol. Other suitable monomers include vinyl chloride, vinylidene fluoride, styrene, α-methyl styrene, the commercial mixed isomers known as vinyl toluene, acrylonitrile, hydroxyl ethyl acrylate or methacrylate and glycidyl methacrylate. The copolymers may contain a proportion, usually a minor proportion, e.g. 1-5% by weight, of the above unsaturated acids themselves.

As mentioned above, the commonly understood meaning of non-convertible coatings does not entirely exclude the possibility of some degree of chemical change taking place during the film hardening process, although the initial drying stage is essentially an evaporative process. Resinous materials of this type which we can employ in the performance of our invention include, for example, the so-called oil-modified polyester and vinyl resins wherein the resin molecules include up to about 40% by weight of autooxidizable fatty acids residues. Materials of this type are, for example: block or graft copolymers in which the condensation product of a dibasic acid or acid anhydride, e.g. phthalic anhydride, with a polyhydric alcohol, e.g. ethylene glycol, glycerol, pentaerithritol, and trimethylol propane and a monobasic fatty acid e.g. linseed, safflower, soya dehydrated castor and tall oil fatty acids, is so-reacted in an addition polymerisation reaction with one or more of the above-mentioned α,β-ethylenically unsaturated monomers; an addition polymer of one or more of the abovementioned α,β-ethylenically unsaturated monomers selected to provide free carboxyl or hydroxyl groups which are subsequently at least partially esterified with an above-described fatty acid or the corresponding fatty alcohol.

The film-forming medium may comprise mixtures of two or more of the above resinous components and additionally non-volatile plasticisers, for example dibenzyl phthalate and dibutyl phthalate, which subsequently form an integral part of the dried undercoat film.

The porous polymeric granules must be insoluble in the liquid undercoat and remain as discrete particles in the dry film. Furthermore, the pores must remain substantially free of film-forming material in the dry film or their beneficial effect on the water absorption would be lost. In general, this means that the particles must comprise essentially closed pores, which can imbibe water by diffusion through the polymeric walls thereof. However, there may be openings in the peripheral surface of the particles provided they are sufficiently small to block the entry of film-forming material. For example if the film-forming material is present in the liquid undercoat as a solution or dispersion of polymer in a volatile liquid satisfactory particles are those having pores which may admit the volatile liquid but not the molecules of resinous film-forming material. That is the particles may be polymeric granules which have a cell-like structure, the walls of which are provided by a shell of polymer. Alternatively the particles may be polymeric granules throughout which is spread a net-like web of pores or ducts defined by the polymer comprising the granule. When the pores or ducts penetrate the surface of the granule they should be so-dimensioned that resinous film-forming material is substantially excluded from penetrating the granule. The polymer of the particles must, as mentioned above, be insoluble in the liquid coating composition and a convenient way of ensuring this is to select granules of cross-linked polymer.

The amount of water which the dry film will absorb is substantially determined by the amount and pore volume of the porous polymeric granules. However, some additional absorptive capacity may be provided by pores occuring within the film as voids between aggregated pigment particles. In general, however, this supplementary water absorption will not exceed 1-2% of the dry film weight in films of useful mechanical strength.

Particularly suitable particulate matter for use in the undercoats of the invention is provided by vesiculated or retiporous insoluble polymer particles, described for example in Canadian Pats. No. 836,861, 877,357 and 884,358 and Belgium Pat. No. 765,099.

The size of the particles is not critical and they are selected with regard to the required nature of the undercoat film. For example, if the top-coat is to be a high-gloss film it is preferable to select porous particles which have a mean diameter of 10 microns or less to reduce sink-back of the dry top-coat and loss of gloss. Larger diameter granules can, however, be used and especially when the undercoat is intended to be sanded before application of the top-coat, particles of mean diameter up to 50 microns or larger may be used.

The invention places no particular limitations on the composition of the top-coat other than those normally associated with the selection of top-coat/undercoat combinations. That is the top-coat can be any conventional protective or decorative paint which is of the non-convertible type provided it has adequate adhesion to the undercoat and can be applied to the dry undercoat film without softening and lifting it from the metallic substrate. This is a conventional basis for the selection of such multiple coat paint systems. Particularly useful top-coats are nitrocellulose lacquers and acrylic lacquers in which the film-forming polymer is a polymer of methyl methacrylate.

The invention is illustrated by the following examples in which all parts are expressed by weight.

EXAMPLE 1

Comparison of the blistering of a conventional paint system and paint systems according to the invention.

A commercial nitrocellulose primer was selected as a control undercoat and then modified in two stages by the addition to it of porous polymeric granules. In each of the modified undercoats an addition of nitrocellulose and plasticising resin was made to keep the proportion of film-forming medium in the dry film constant. A polymeric adhesion promoter, a poly(methyl methacrylate/butyl acrylate/acrylic acid), of ratios 82/10/8 by weight was also added to the second modified undercoat. The composition of the three undercoats and their water absorptions determined as described above are given in the following table.

The porous polymeric particles were vesiculated granules of cross-linked polyester resin with a void volume of approximately 20% and mean diameter of 20 microns.

Each undercoat was applied by spraying to scuffed and solvent washed steel panels to give a dry film build, after air drying, of approximately 50 microns. A similar build of a commercial white nitrocellulose lacquer was then applied to each of the undercoated panels and allowed to air-dry for 24 hours.

The panels were then tested for humidity performance by the American Society for Testing and Materials Method D2247–68 at 38° C. and 100% relative humidity. The paint systems were judged to fail for humidity resistance when the first blisters were observed in the films. The results were as follows:

|  | Control | Sample 1 | Sample 2 |
|---|---|---|---|
| Commercial nitrocellulose primer, parts | 70 | 70 | 83 |
| 30% by wt. nitrocellulose solution, parts | 8.7 | 8.7 |  |
| 60% by wt. alkyd plasticiser solution (36% coconut oil modified alkyd resin), parts | 13.6 | 13.6 |  |
| Polymeric adhesion promoter, parts |  |  | 13.6 |
| Percent wt. porous polymer particles in dry film | 0 | 15.0 | 14.5 |
| Water absorption, percent | 2.1 | 7.3 | 6.6 |
| Onset of blistering in hours | <24 | 60 | 182 |

It will be seen that the systems in which the undercoat had a water absorption greater than 5% had markedly superior blister resistance to the control, especially in the presence of an adhesion promotor.

EXAMPLE 2

Humidity performance of a series of paint systems in which the undercoats comprised acrylic copolymer solution film-forming media.

The following is the basic undercoat formula used in this example:

|  | Parts |
|---|---|
| Hydrated aluminum silicate extender | 12.90 |
| Talc | 31.30 |
| Titanium dioxide | 5.30 |
| Commercial montmorillonite - based suspending agent | 1.80 |
| Ethanol | 8.50 |
| Toluene | 4.00 |
| Dimethyl ketone | 5.50 |
| Film-forming medium (expressed as solids) | 12.24 |

The materials were milled to gether in a conventional laboratory ball mill, the film-forming medium being used in the form of a solution of polymer in volatile solvents.

An undercoat (Base A) was prepared to the above basic formula using a 40% by weight solution of poly(styrene/2-ethyl hexyl acrylate) in the weight ratio of 83/17 in a mixture of toluene and methyl ethyl ketone as the solution of film-forming medium. When thinned and sprayed onto scuffed and solvent washed steel panels the undercoat gave dry films of poor adhesion to the substrate. Because of its poor wet adhesion the water absorption of the dry film could not be determined. No significant improvement in adhesion was observed when incremental additions of up to 20% of porous polymer particles were made to the undercoat.

A second undercoat (Base B) was prepared by the above method using as the solution of film-forming material a 46% by weight solution of poly(methyl methacrylate/2-ethyl hexyl acrylate/n-butyl amino hydroxy ethyl methacrylate), in the ratios by weight 78.6/4.7/14.7, in a mixture of toluene and iso-propanol. A dry film of this undercoat adhered well to steel panels and had a water absorption of less than 1% by weight. When tested by the method of Example 1 the undercoat/topcoat paint system started to blister in less than 24 hours.

A blend of Base A and the solution of film-forming medium of Base B was found to have adequate adhesion as a dry film on steel panels. A range of undercoat compositions as shown below was prepared and retiporous urea/formaldehyde polymer granules of mean diameter 30 microns added to them in incremental amounts, the proportion of Base B being adjusted to keep the amount of film-forming medium constant in each of the undercoats so-formed. The water absorptions of the undercoat films and of paint systems prepared and tested according to Example 1 were determined, with the following results:

| Number | 1 | 2 | 3 | 4 |
|---|---|---|---|---|
| Base: |  |  |  |  |
| A, parts | 50.0 | 50.0 | 50.0 | 50.0 |
| B, parts | 42.1 | 47.5 | 53.4 | 59.6 |
| Percent retiporous granules in undercoat film | 6 | 8 | 10 | 12 |
| Percent water absorption of undercoat | 6 | 9 | 10 | 9 |
| Onset of blistering in hours | 168 | 192 | 228 | 240 |

From the results it can be seen that provided the undercoat before the addition of porous polymer granules has adequate adhesion to the metal substrate, the addition of porous granules to give an undercoat, the dry film of which has a water absorption in excess of 5%, results in a marked increase in freedom from blistering under the test conditions.

EXAMPLE 3

The use of retiporous polymer granules to provide a paint system of high blister resistance.

The effect of varying the water absorptioin of an undercoat by changes in the porous polymer particle content thereof was studied by making incremental additions of retiporous urea/formaldehyde granules of about 28 microns mean diameter to a basic undercoat formula. The proportion of film-forming medium was held constant in the dry film by corresponding adjustments to the formula. For convenience in manipulation, two undercoat bases were prepared and subsequently mixed in the required proportions, one of the bases being free of and the other containing the retiporous granules of urea/formaldehyde resin. The bases were prepared by conventional ball milling, to the following formulae:

| Base | C, parts | D, parts |
|---|---|---|
| Hydrated aluminium silicate extender | 9.5 | 14.9 |
| Talc | 17.2 | 32.6 |
| Titanium dioxide | 4.2 | 5.0 |
| Commercial montmorillonite based suspending agent | 0.9 | 1.8 |
| Ethanol | 1.4 | 1.1 |
| n-Butyl acetate | 4.5 |  |
| Methyl ethyl ketone |  | 5.4 |
| Dimethyl ketone | 4.9 | 4.5 |
| Solution of film forming material | 51.6 | 34.6 |
| Retiporous granules | 5.9 |  |

The granules were not milled into the the Base C but were stirred into the composition after milling. The solution of film-forming material was a 40% by weight solution in a mixture of toluene and methyl ethyl ketone of a poly(methyl methacrylate/2-ethyl hexyl acrylate/acrylic acid) in the weight ratios of 80/5/15.

The bases were blended in the proportions shown below to give six undercoats, the performance of which when tested according to the method of Example 1 is summarised as follows:

| Number | 1 | 2 | 3 | 4 | 5 | 6 |
|---|---|---|---|---|---|---|
| Base: | | | | | | |
| C, parts | 70 | 70 | 70 | 70 | 70 | |
| D, parts | | 10 | 20 | 30 | 40 | 100 |
| Percent granules in undercoat film | 12.8 | 10.4 | 8.1 | 6.2 | 4.4 | 0 |
| Percent water absorption of undercoat | 24 | 23 | 10 | 14 | 17 | <1 |
| Onset of blistering in hours | 120 | 96 | 72 | 72 | 48 | <24 |

These results show once again the increase in blister resistance of a paint system according to the invention. The increase in blister resistance increase roughly with the increase in water absorption of the undercoat film.

EXAMPLE 4

The use of vesiculated polymer granules to provide a paint system of high blister resistance.

By the general method of Example 3 a series of four undercoats was prepared but substituting on a solids basis a 50% by weight solution in a mixture of toluene and methyl ethyl ketone of poly (methyl methacrylate/butyl acrylate/acrylic acid), in the ratios of 82/10/8, for the solution of film-forming material of that example and similarly replacing the retiporous granules with vesiculated cross-linked polyester granules of about 8 microns mean diameter.

The undercoats so-prepared were tested by the method of Example 1 with the following results:

| Number | 1 | 2 | 3 | 4 |
|---|---|---|---|---|
| Base: | | | | |
| With granules, parts | 70 | 60 | 40 | 30 |
| Without granules, parts | | 10 | 30 | 40 |
| Percent granules in undercoat film | 12.8 | 10.4 | 6.2 | 4.4 |
| Percent water absorption of undercoat | 7.7 | 7.1 | 5.4 | 5.0 |
| Onset of blistering in hours | 96 | 96 | 72 | 72 |

EXAMPLE 5

The importance of using an undercoat with a water absorption of at least 5% is demonstrated.

A base undercoat was prepared according to Example 2 but replacing the solution of film-forming medium of that example with a 40% by weight solids solution of poly (methyl methacrylate/2-ethyl hexyl acrylate/acrylic acid), of weight ratios 76.8/4.7/14.7. A series of six undercoats was prepared from this base undercoat by adding to separate portions thereof retiporous urea/formaldehyde polymer granules of mean diameter approximately 30 microns and additional film-forming medium to keep the dried film content constant.

Paint systems comprising this undercoat were tested according to Example 1 with the following results:

| Number | 1 | 2 | 3 | 4 | 5 | 6 |
|---|---|---|---|---|---|---|
| Base undercoat, parts | 50.0 | 50.0 | 50.0 | 50.0 | 50.0 | 50.0 |
| Solution of film-forming material, parts | 25.5 | 48.9 | 66.7 | 94.0 | 138.0 | 219.0 |
| Retiporous granules added (as percent of total solids) | | 8 | 12 | 16 | 20 | 24 |
| Percent water absorption of undercoat | 3.6 | 16.0 | 20.0 | 25.0 | 27.0 | 34.0 |
| Onset of blistering in hours | 24 | 120 | 120 | 268 | 384 | 384 |

The paint system in which the undercoat had a water absorption of less than 5% gave a substantially worse performance than systems according to the invention.

EXAMPLE 6

The method of Example 5 was repeated but substituting for the solution of film-forming material of that example a 51% weight solution of a poly (styrene/butyl acrylate/acrylic acid) of weight ratios 82/10/8. The testing results, showing once again the importance of the water absorption of the undercoat, were as follows:

| Number | 1 | 2 | 3 |
|---|---|---|---|
| Base undercoat, parts | 60.0 | 60.0 | 60.0 |
| Solution of film-forming material, parts | | 9.3 | 14.9 |
| Retiporous granules added (as percent of total solids), parts | | 8.4 | 10.6 |
| Percent water absorption of undercoat, parts | <1 | 5.5 | 8.3 |
| Onset of blistering in hours | <24 | 48 | 96 |

EXAMPLE 7

Humidity performance of paint systems in which the film-forming material of the undercoat is a methyl methacrylate polymer.

The following mixture:

| | Parts |
|---|---|
| Rutile titanium dioxide | 41.6 |
| Porous polyester granules | 20.9 |
| Methyl methacrylate polymer solution [1] | 121.0 |
| Methyl ethyl ketone | 25.0 |
| Toluene | 25.0 |
| Commercial acrylic lacquer thinner | 64.0 |

[1] 42.4% by weight solution in toluene and methyl ethyl ketone of poly(methyl methacrylate/butyl acrylate/acrylic acid) in the ratio of 60/30/10 by weight.

was mixed to a homogenous conssistency in a sand-grinder and stained to give a pigmented acrylic undercoat. The porous polyester granules were of about 10 microns mean diameter and comprises 30% by volume of vehicles of approximately 1 micron mean diameter.

The undercoat so-prepared was sprayed onto two cleaned and scuffed steel panels and allowed to dry in air, the dry film build being about 40 microns. One undercoated panel was then sprayed with a white commercial nitrocellulose lacquer and the other with a white commercial acrylic lacquer (film-forming material essentially methyl methacrylate polymer). The air-dried film were then tested by the method of Example 1 with the following results:

| Panel number | 1 | 2 |
|---|---|---|
| Percent water absorption of dry undercoat film | 16.9 | 16.9 |
| Top-coat | Nitrocellulose | Acrylic |
| Onset of blistering in hours | Over 650 | Over 650 |

EXAMPLE 8

Humidity performance of paint systems in which the film-forming material of the undercoat is a methyl methacrylate polymer.

By the general method of Example 7 an undercoat was prepared from the following materials in which the granules used were as in Example 7 and the methyl methacrylate polymer solution was a 41% by weight solution in toluene and methyl ethyl ketone of a poly (methyl methacrylate/butyl acrylate/acrylic acid) in the ratio of 80/10/10 by weight.

In a similar manner to that of Example 7, panels were prepared with nitrocellulose and acrylic lacquer top-coats over films of the above undercoat and their humidity performance measured. The test results were as follows:

| Panel number | 1 | 2 |
|---|---|---|
| Percent water absorption of dry undercoat film | 18.7 | 18.7 |
| Top-coat | (1) | Acrylic |
| Onset of blistering in hours | 264 | 336 |

[1] Nitrocellulose.

EXAMPLE 9

Use of a top-coat in which the film-forming material is a graft copolymer in which the condensation product of a dibasic acid anhydride with a polyhydric alcohol and a monobasic fatty acid have been co-reacted in an addition polymerisation reaction with styrene.

Example 8 was repeated but the acrylic lacquer of that example was replaced by a top-coat in which titanium dioxide was dispersed in a solution in xylene of a drying oil modified polyester resin further modified by copolymerisation with styrene, to a pigment volume concentration of 18 (based on the total solids of the composition). The approximate composition of the resin was:

| | Percent |
|---|---|
| Polyol/phthalic anhydride condensate | 39 |
| Fatty acids residues | 31 |
| Poly(styrene) | 30 |

The top-coat at package viscosity had a total solids content of about 60% by weight. When further diluted with xylene and sprayed onto the hard, dry undercoat film, the top-coat air dried rapidly to a dry film, which was observed to increase in hardness due to some supplementary degree of chemical curing over a period of several days. The humidity performance, tested in a similar manner to that of Example 8, gave the following results:

| Panel number | 1 | 2 |
|---|---|---|
| Percent water absorption of dry undercoat film. | 18.7 | 18.7 |
| Top-coat | Nitrocellulose | Styrene/fatty acid modified polyester.[1] |
| Onset of blistering in hours | 250 | 190 |

[1] Mixed linseed/tung fatty acids.

Two control samples in which porous polymer granules were omitted from the undercoat but the paint films were otherwise the same as the above, blistered in less than 24 hours, thereby demonstrating the superior humidity performance of paint systems according to the invention over conventional systems.

I claim:

1. A paint system which resists blistering under conditions of high humidity, the system consisting of a metallic substrate to which is adhered a multi-layer non-convertible coating film consisting of a layer of undercoat and a superimposed layer of paint top-coat characterized in that the dried undercoat layer has a water absorption of from 5 to 65% of its dry layer weight provided essentially by the incorporation therein of discrete, porous polymer particles which are insoluble in the liquid coating composition of the undercoat layer and wherein any openings in the surface of the particles are sufficiently small to block entry of a film forming material of the undercoat.

2. A paint system according to claim 1 in which the undercoat comprises a film-forming material selected from nitrocellulose, cellulose acetate butyrate, a polymer of methyl methacrylate and a block or graft copolymer of the condensation product of a dibasic acid or acid anhydride with a polyhydric alcohol and a monobasic fatty acid co-reacted in an addition polymerisation reaction with at least one $\alpha,\beta$-ethylenically unsaturated monomer provided also that the weight of fatty acid residues in the copolymer does not exceed about 40% by weight.

3. A paint system according to claim 2 in which the top-coat comprises a film-forming material selected from nitrocellulose, cellulose acetate butyrate, a polymer of methyl methacrylate and a block or graft copolymer of the condensation product of a dibasic acid or acid anhydride with a polyhydric alcohol and a monobasic fatty acid co-reacted in an addition polymerisation reaction with at least one $\alpha,\beta$-ethylenically unsaturated monomer provided also that the weight of fatty acid residues in the copolymer does not exceed about 40% by weight.

4. A paint system according to claim 1 wherein the porous polymer particles are vesiculated or retiporous granules having a maximum diameter of 50 microns.

References Cited

UNITED STATES PATENTS

| 3,231,410 | 1/1966 | Huber et al. | 117—75 |
| 3,639,147 | 2/1972 | Benefiel et al. | 117—75 X |
| 3,371,053 | 2/1968 | Raskin | 260—2.5 B |
| 3,630,975 | 12/1971 | Wingler et al. | 260—2.5 B |

RALPH HUSACK, Primary Examiner

U.S. Cl. X.R.

117—75, 79, 89; 260—41 C